(12) United States Patent
Pierce (10) Patent No.: US 9,854,756 B2
(45) Date of Patent: Jan. 2, 2018

(54) GROWTH CONTAINER GARDENING SYSTEM

(71) Applicant: Larry Pierce, Newalla, OK (US)

(72) Inventor: Larry Pierce, Newalla, OK (US)

( * ) Notice: Subject to any disclaimer, the term of this patent is extended or adjusted under 35 U.S.C. 154(b) by 300 days.

(21) Appl. No.: 14/756,497

(22) Filed: Sep. 10, 2015

(65) Prior Publication Data

US 2016/0081283 A1    Mar. 24, 2016

Related U.S. Application Data

(60) Provisional application No. 62/071,447, filed on Sep. 24, 2014.

(51) Int. Cl.
*A01G 27/00*    (2006.01)
*A01G 27/06*    (2006.01)

(52) U.S. Cl.
CPC .......... *A01G 27/06* (2013.01); *A01G 27/003* (2013.01); *A01G 27/005* (2013.01)

(58) Field of Classification Search
CPC .... A01G 27/00; A01G 27/005; A01G 27/006; A01G 27/02; A01G 27/04; A01G 27/06
USPC ....................... 47/48.5, 79, 80, 81
See application file for complete search history.

(56) References Cited

U.S. PATENT DOCUMENTS

| | | | |
|---|---|---|---|
| 2,060,735 A * | 11/1936 | Krueger | A01G 27/005 137/255 |
| 2,695,474 A | 11/1954 | Barstow | |
| 3,053,011 A * | 9/1962 | Silverman | A01G 31/06 47/32 |
| 4,603,506 A * | 8/1986 | Powell, Jr. | A01G 31/00 47/48.5 |
| 4,965,963 A | 10/1990 | Lyon | |
| 5,009,029 A * | 4/1991 | Wittlin | A01G 31/02 47/18 |
| 5,076,010 A * | 12/1991 | Rollins | A01G 27/003 47/62 R |
| 5,189,834 A | 3/1993 | Green | |
| 5,355,618 A * | 10/1994 | Pedersen | A01G 9/247 239/428.5 |
| 5,379,548 A | 1/1995 | Peterson | |
| 5,426,889 A | 6/1995 | Buora | |
| 6,226,921 B1 | 5/2001 | Kang | |
| 6,418,664 B1 | 7/2002 | Shaw | |
| 7,266,924 B2 * | 9/2007 | Van De Lande | A01G 9/1423 47/62 R |
| 7,856,755 B2 | 12/2010 | Riesterer | |

(Continued)

*Primary Examiner* — David Parsley
(74) *Attorney, Agent, or Firm* — Randal D. Homburg (57) ABSTRACT

A horizontal container gardening system for the regulated and automatic watering of plants grown within the system provides a large capacity water regulator having an internal water control device, supplying a controlled amount of water through connecting tubing to at least one growth container providing a constant water source to an elevated and covered plant growth medium suspended upon a platform above an elevated support structure, with at least one column of the plant growth medium extending into a bottom reservoir portion of the container, lifting water into the plant growth medium through passive wicking providing water to the roots of the plants growing within the elevated plant growth medium. The growth container may be attached to one another in series by additional tubing.

3 Claims, 6 Drawing Sheets

(56) References Cited

U.S. PATENT DOCUMENTS

| | | |
|---|---|---|
| 8,381,441 B2 | 2/2013 | Altendorfer |
| 2009/0126269 A1* | 5/2009 | Wilson .................. A01G 31/00 47/62 R |
| 2009/0277085 A1* | 11/2009 | Stewart ................. A01G 9/028 47/79 |
| 2010/0313474 A1* | 12/2010 | Williams ............... A01G 9/023 47/65.7 |
| 2011/0162272 A1 | 7/2011 | Junkeer |
| 2011/0179708 A1 | 7/2011 | Stewart |
| 2012/0210642 A1 | 8/2012 | Tomas |
| 2014/0109447 A1 | 4/2014 | Goodsen |

* cited by examiner

GROWTH CONTAINER GARDENING SYSTEM

CROSS REFERENCE TO RELATED APPLICATIONS

Applicant claims the benefit of U.S. Provisional Patent Application No. 62/071,447, filed on Sep. 24, 2014, by the same inventor.

I. BACKGROUND OF THE INVENTION

1. Field of Invention

A container gardening system for the regulated and automatic watering of plants grown within the system provides a large capacity water regulator having an internal water control device, supplying a controlled amount of water through connecting tubing to at least one growth container providing a constant water source to an elevated and covered plant growth medium suspended upon a platform above an elevated support structure, with at least one column of the plant growth medium extending into a bottom reservoir portion of the container, lifting water into the plant growth medium through passive wicking providing water to the roots of the plants growing within the elevated plant growth medium.

2. Description of Prior Art

A preliminary review of prior art patents was conducted by the applicant which reveal prior art patents in a similar field or having similar use. However, the prior art inventions do not disclose the same or similar elements as the present plant growth container system, nor do they present the material components in a manner contemplated or anticipated in the prior art.

U.S. Pat. No. 4,965,963 to Lyon includes a lower support that appears to be some type of folded or thin vertical planar support, like a portion of the folded elevated support matrix made form a corrugated plastic sheet, as would be one embodiment of the lower support matrix of the present invention. However, it requires a capillary wick to supply the water contained in the bottom of the plant pot into the growth soil. It further lacks reference to an connection or automatic water supply. In U.S. Pat. No. 5,426,889 to Buora, there is disclosed a potting soil of plant growth medium in communication with the lower water supply with a natural aspiration of water to the above material. It has a "roof" which support soil within the portion of the container above the roof and defines automatic aspiration columns filled with some type of cultivation substratum (28) to introduce water from the reservoir below the "roof" and carry it up to the soil above the roof. However, there is no true definition of this material within the patent, so it may simply be soil. However, the watering of this materials is conducted from above, the liquid stored below the "roof" and introduced into the materials by either pouring the water through the material in the upper pot 12 into the reservoir or apparently introducing the water directly into the lower pot 13, which could be done in a view of FIG. 2. There is also no overflow diversion which would prevent water from spilling out of the lower pot.

Shaw, U.S. Pat. No. 6,418,664, has a float regulator but no anywhere near that which is employed into the present invention. It requires an electronic float sensor which apparently requires a battery or power supply and water is presented to the soil by a wick (6) from a water reservoir. The reservoir is filled like a kerosene lantern. In fact, Shaw appears to be a kerosene lantern except the liquid is water and the delivery destination is soil. A multiple container system is disclosed in U.S. Patent Application No. 2011/0179708 to Stewart, connecting more than one growth container to a common lower water supply 24, and also employs a float valve 12. There is a elevating matrix and a platform over which soil is applied. Water is transferred from the lower reservoir to the soil above the platform by a wicking blanket 102, simply called a wick 102, which is defined as a fabric-like material that exhibits the ability to wick water, such as strips of felt, terry cloth, or wool. [0038] Another published application, U.S. Patent Application No. 2012/0210642 to Tomas, provides a plant watering system forming boxes connected together with a ball cock regulator between each box, the box providing a platform for the placement of potted plants 20 a-d, and a punch out for the further connection of boxes in series.

It is the contention of the present inventor that these prior art patent, alone and in combination, do not provide the elements presented in the claims of the present invention, nor do they provide the basis of contention that those skilled in the art would find the claims subject matter obvious derivatives of the known prior art. Do to the distinction pointed out in the remaining specification and claims below.

II. SUMMARY OF THE INVENTION

A multiple container gardening system comprising a large water reservoir, a water regulator tank having a controlled water level cutoff means with an inlet in communication with the large water reservoir and an outlet in communication with an outlet tube, and at least one growth container defining a shaped container, a foldable support matrix in the bottom of the container, a perforated support mat above the deployed support matrix, a lower inlet attached to the outlet tube of the water regulator tank introducing a controlled amount of water into the bottom of the container and pooled within the support matrix, a quantity of plant growth medium above the support mat, the support mat having at least one large bore providing communication into the bottom of the container. Plant growth medium is introduced which aspirates water in the bottom of the container into the plant growth medium above the support mat, the container further defining a lower outlet, which may be connected by tubing to multiple additional growth containers, wherein the plant growth medium is supplied with a top coat of water soluble plant nutrient and a layer of black plastic is placed on the top of the growth container, the black plastic having a perforation at any point where a plant is placed into the plant growth medium. The black plastic is held taut by an upper rim attachment, the black plastic acting to eliminate weed growth, to contain condensate and allow the condensation to return to the plant growth medium from the top, liquefying some of the plant nutrient and carrying into the plant growth medium and the plants being grown within. A direct access tube which extends above the black plastic down into the bottom of the container is also provided to directly add nutrient and to initially fill the bottom of the container with water and may be left in place for future direct addition as desired.

III. DESCRIPTION OF THE DRAWINGS

The drawings are formal drawings submitted with this non-provisional patent application.

FIG. 9 is an exploded diagram of the growth container.

IV. DESCRIPTION OF THE PREFERRED EMBODIMENT

Figure 1:
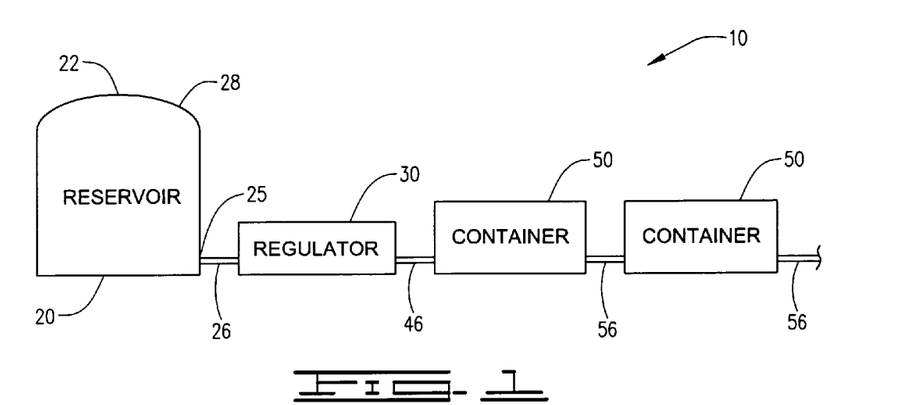
FIG. 1 is a diagram of the container gardening system disclosing a water reservoir, a controlled water regulator tank and at least one growth container.
Figure 2:
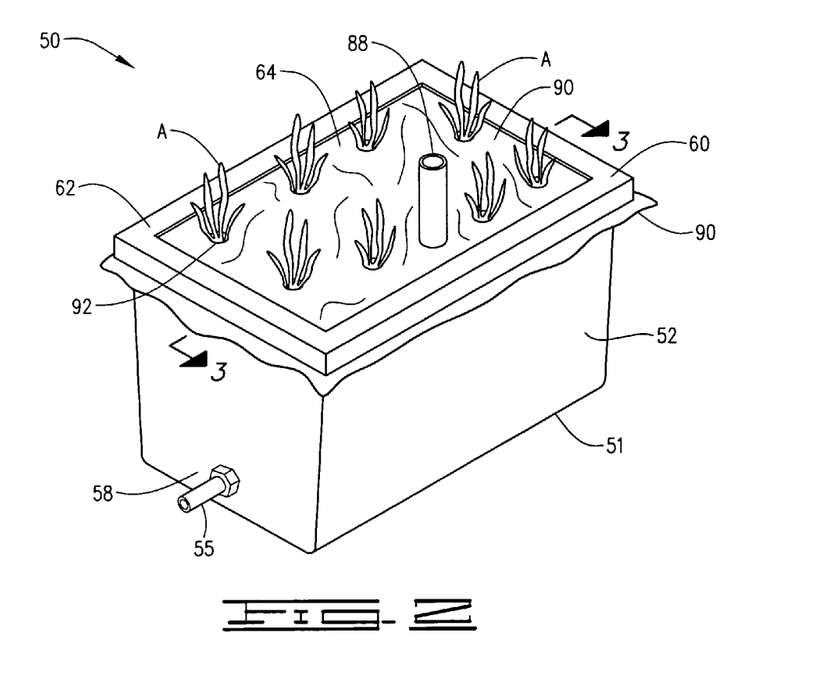
FIG. 2 is an upper perspective view of a growth container with a series of plants being grown within the growth container through the black cover sheet.
Figure 3:
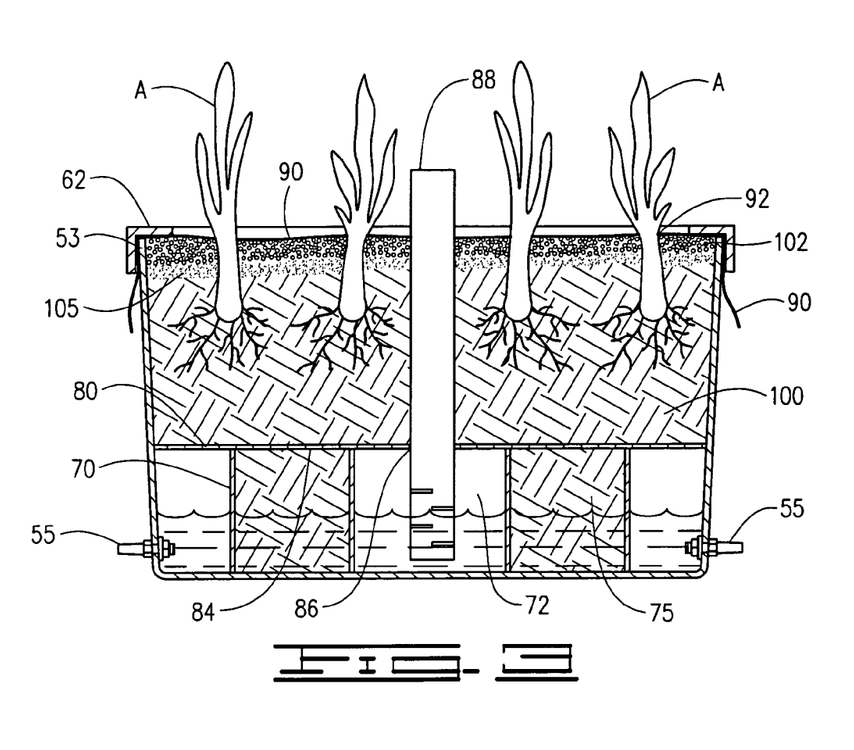
FIG. 3 discloses a cross-section of a growth container along section lines 3/3 of FIG. 2.
Figure 4:
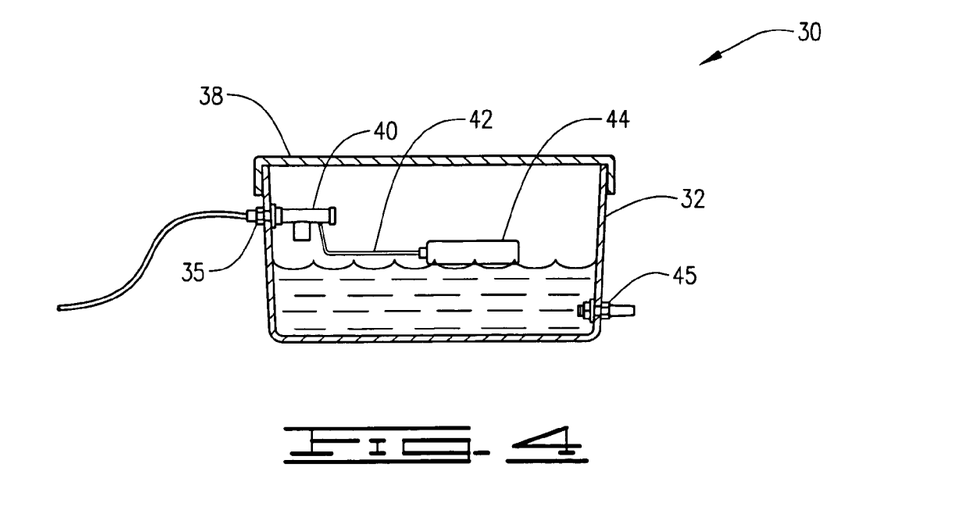
FIG. 4 is a cross sectional view of the controlled water regulator tank.
Figure 8:
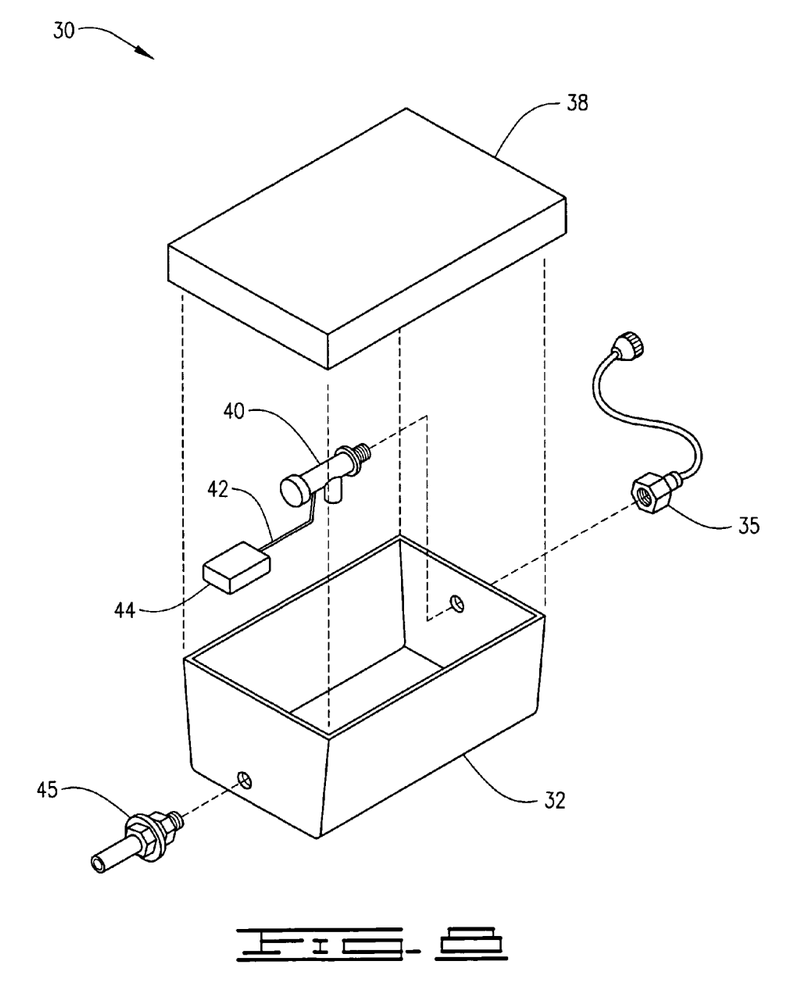
FIG. 8 is an exploded diagram of the controlled water regulator tank.

A self-watering container gardening system 10 for growth of plants A in an optimally controlled environment, as shown in FIGS. 1-9 of the drawings, provides the system 10 having a large capacity water reservoir or water supply 20, a water regulator tank 30 and at least one growth container 50, the large capacity reservoir 20 containing a quantity of fresh water for dispensing to the remainder of the system 10, the reservoir having an intake opening 22 for the filling of the reservoir 20, and a lower outlet 25 attaching a water hose 26, the water regulator tank 30, FIGS. 4 and 8, defining a water container 32 having an inlet hose fitting 35 attaching to the reservoir 20 through the water hose 26, the inlet hose fitting 35 further and inwardly extending a water shutoff valve 40 attaching a float arm 42 with a float 40 set to regulate a specific amount of water contained within the water regulator tank 30, and an external outlet hose fitting 45 for the attachment of another water hose 46, and the at least one growth container 50, FIGS. 2, 3 and 9, providing a bottom 51, sides 52, and an upper rim 53, defining an inner cavity 54, the container further defining a pair of lower recesses in opposing sides 52, each lower recess having a pair of hose fittings 55 for the connection of the water hose 46 to communicate with the outlet hose fitting 45 of the water regulator tank 30 or by a water line 56 to an additional growth container 50, FIG. 1. Alternatively, the water reservoir may be any fresh water supply, including a water outlet, cistern water tower or water tank. The upper rim 53 attaches a container lid 60, FIGS. 2, 3 and 9, the lid defining an outer perimeter 62 which is secured to the upper rim 53, and a large central cutout portion 64, FIGS. 2 and 3.

Figure 5:
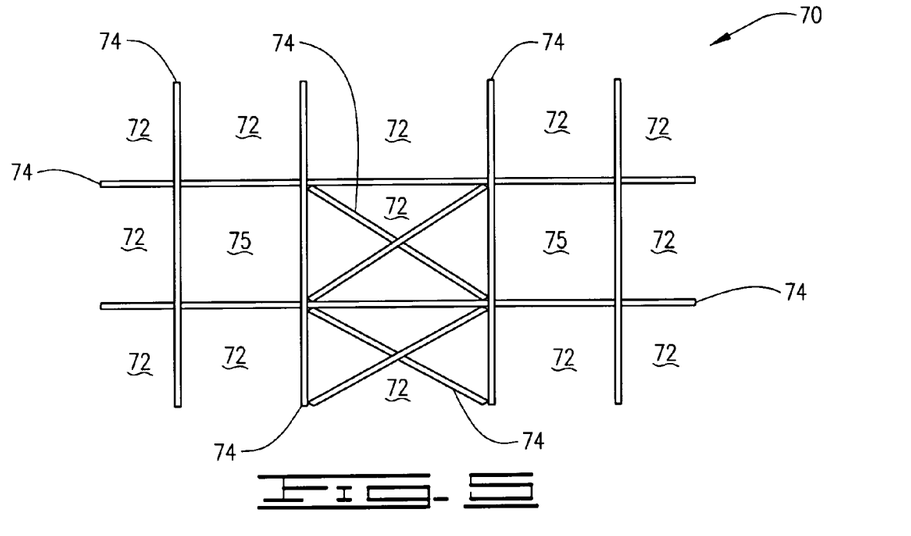
FIG. 5 is an embodiment of the elevated support structure.
Figure 6:
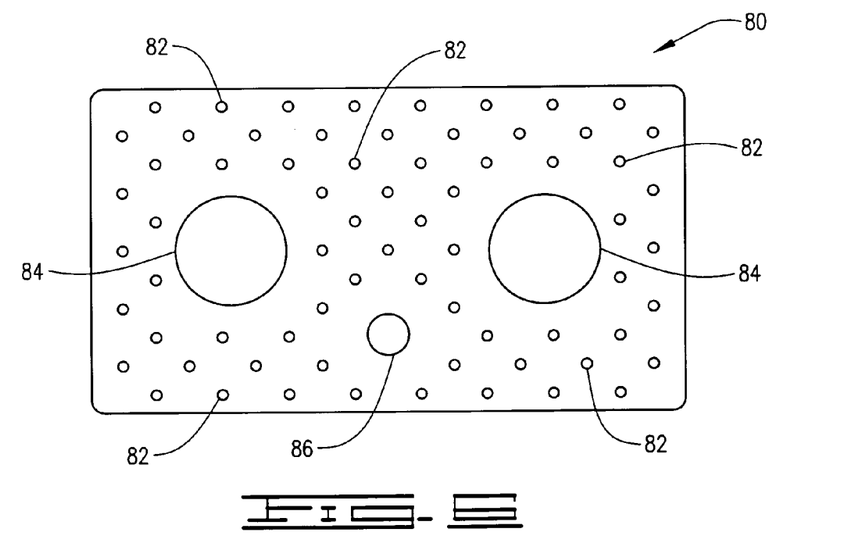
FIG. 6 is an upper view of the support mat.
Figure 7:
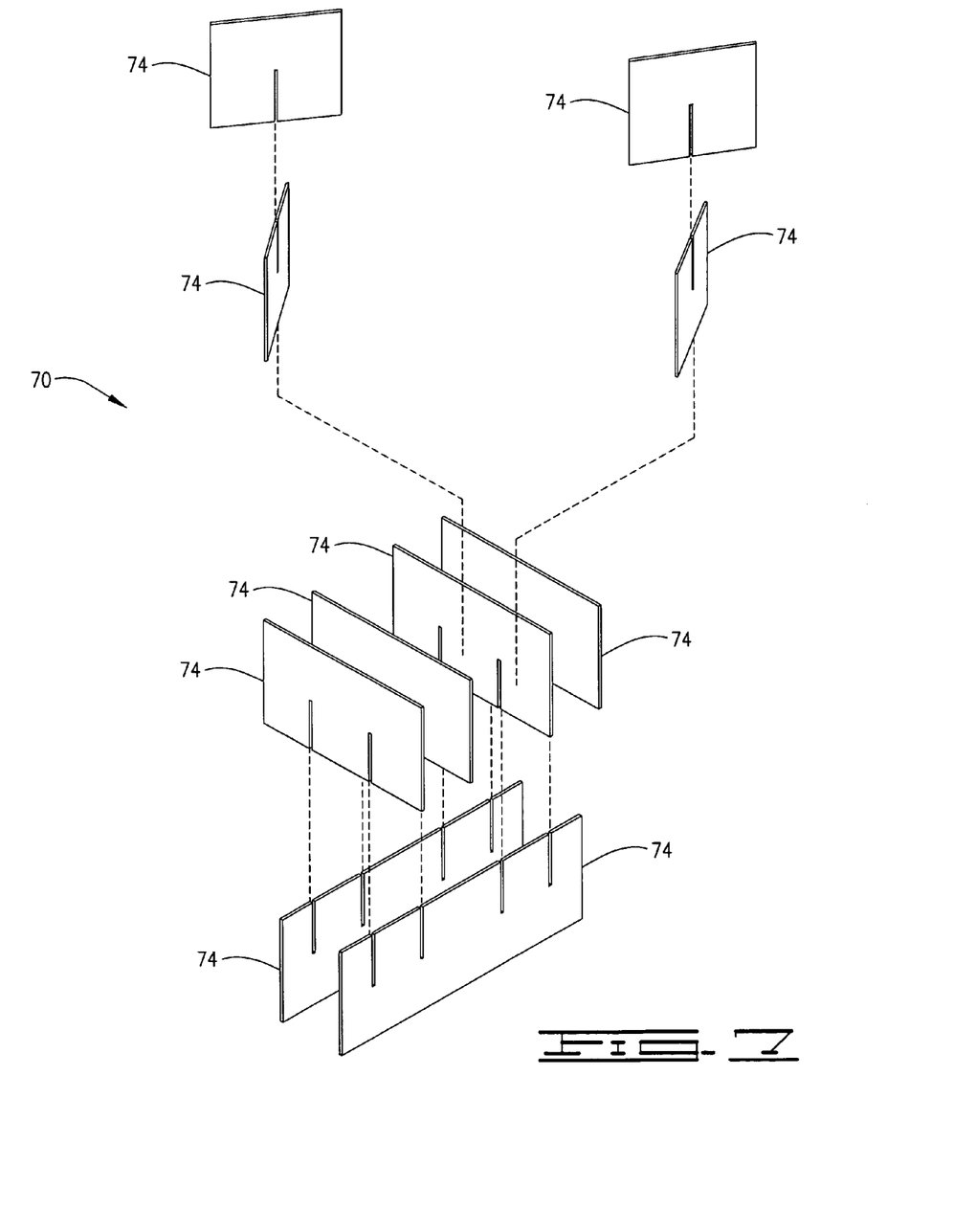
FIG. 7 is an exploded diagram of the elevated support structure.

The inner cavity 54 receives an elevated support structure 70, FIGS. 5, 7 and 9, providing numerous segregated cells 72 which are open vertically. This support structure 70 may include an assembly of interlocking flat components 74, FIG. 7, or may be collapsible for a flat profile folding during shipping. The elevated support structure 70, FIGS. 3, 5, 7 and 9, is made of water proof materials which do not deform subsequent to assembly and deployment for use, the elevated support structure 70 closely conforming to the shape as the bottom 51, sides 52 and inner cavity 54 of the container 50. A flat support mat 80, FIGS. 3, 6, and 9, also conforming in shape to the sides 52 and inner cavity 54 of the container 50 above the elevated support structure 70, is placed above the elevated support structure 70, FIG. 3, the support mat 80 defining a plurality of perforations 82 and also defining at least one growth medium port 84 and at least one direct access port 86, FIG. 6.

The growth containers 50 may be provided in a plurality of containers, with each growth container connecting in series by water lines 56, in a near unlimited number of containers, provided that the containers are level or positioned on a declining elevation. The water regulator tank 30 and the large capacity reservoir 20 may also include lids 28, 38 respectively, to keep out contaminants and debris, and the large capacity reservoir 20 would ideally be a rain barrel which collected rain or runoff of a natural water source.

Once the elevated support structure 70 is installed within the inner cavity 54 of the container 50 with the support mat 80 located above the elevated support structure 70, a direct supply tube 88, FIGS. 2, 3 and 9, is vertically installed through the direct access tube port 86 into the bottom 51 of the container 50 and a growth medium 100 is placed above the support mat 80 up to the upper rim 53, the growth medium also being deposited through the growth medium port 84 extending all the way to the bottom 51 of the container 50 through at least one wicking cell 75 formed within the elevated structure 70, FIG. 3. The growth medium should be packed but not compressed upon the support mat 80 forming a slight crown above the upper rim 53. It is preferred that this crown of the growth medium, have a portion of dolomite 105 mixed within it to enhance water absorption, FIG. 3, with a small strip of fertilizer 102 or plant food along a line upon the growth medium. A sheet of black plastic 90 is stretched over the growth medium 100, dolomite 105 and fertilizer 102 and held taut across the surface of the growth medium, FIG. 3, by the attachment of the container lid 60 to the upper rim 53. Plants A are planted within the growth medium through one or more small intentional incisions 92 through the black plastic 90 with the roots placed within the growth medium 100, FIGS. 2 and 3. Water is then introduced into the bottom 51 of the container 50 either through the water hose 46 from the water regulator tank 30 or, at the time of initial water introduction, through the direct supply tube 88. Water in the bottom 51 of the container 50 will be draw by wicking throughout the growth medium 100 within the container 50 through the growth medium within the wicking cell 75 and cell in the elevated support structure 70.

In the single container, one of the pair of hose fitting 55 nearest in proximity and connected to the water regulator tank 30, admits water to the bottom 51 of the container 50 which pools within the bottom of the container 50 up to a level of the other one of the pair of hose fittings 55, where any water collecting above the pair of hose fittings 55 is released so that a consistent amount of water remains within the bottom 51 of the container 50 at all times, FIG. 3. In the multiple container system, FIG. 1, overflow water amounts are discharged through one of the pair of hose fittings 55 through a water tube 56 to the next container 50, and so forth. In the complete system, water constantly fills the water regulator tank 30 flowing water into the first attached growth container 50, with the first growth container sending water to the second growth container, in turn sending water to the third growth container, and so forth.

As water saturates the growth medium 100, the roots of the plants A grown will receive and constant and steady amount of moisture without top watering, over watering or underwatering. The black plastic 90 also aids in perpetual and constant water regulation within the growth medium 100 by providing a condensation barrier. Water which would normally evaporate and be lost to the air is condensed beneath the taut plastic sheet 90 and drips back into the growth medium 100. With the fertilizer 102 or plant food applied above the growth medium 100, each time water collects beneath the black plastic 90 and returns into the growth medium 100, a small amount of the fertilizer 102 or plant food is dissolved and carried back into the growth medium 100, FIG. 3. Excess condensate is further transported through the growth medium through the plurality of perforations 82 in the support mat 80 and returned to the bottom 51 of the container 50. This cycle occurs perpetually.

Additional features of the system would include the attachment of the container lid with screws or other locking devices to prevent displacement of the black plastic sheet, not shown. Emergency overflow holes may be placed in one or more of the sides 52 of the container 50, also not shown. While the system 10 would best be provided as a kit, the purchaser may be required to provide their own growth medium 100 which is preferably potting soil. The fertilizer 102 is preferably a 10-20-10 pellet fertilizer and the dolomite 105 is supplied in the form of a powder. The black plastic sheet 90 may be provided by a thick ply plastic trash or leaf bag. These above items are likely necessary when the purchaser chooses to reuse the system 10 during more than one growth season in the event the original system is supplied as a complete components kit.

Although the embodiments of the self-watering container gardening system 10 have been described and shown above, it will be appreciated by those skilled in the art that numerous modifications may be made therein without departing from the scope of the invention as herein described.

What is claimed is:

1. A self-watering horizontal container gardening system for growth of plants in an optimal controlled environment comprising:
    a continuous fresh water source, defining a large capacity reservoir or water supply, having a lower outlet attaching a water hose;
    a water regulator tank defining a water container having an inlet hose fitting attaching to said reservoir through said water hose, said inlet hose fitting further and inwardly extending a water shutoff valve attaching a float arm with a float set to regulate a specific amount of water contained within said water regulator tank and an external outlet hose fitting attaching a water hose providing a perpetual regulated water source through said outlet hose fitting;
    at least one growth container defining a bottom, sides, an upper rim, and an inner cavity, said container further defining a pair of hose fittings, with one of said pair of hose fittings connecting a water line to communicate with said outlet hose fitting of said water regulator tank and another of said pair of hose fittings for connection to an optional additional growth container;
    a waterproof elevated support structure conforming in shape to said inner cavity defining a plurality of segregated cells including at least one wicking cell;
    a container lid attaching to said upper rim of said growth container and defining a central cutout portion;
    a flat support mat conforming in shape to said inner cavity defining a plurality of perforations and also defining at least one growth medium port and at least one direct access tube port vertically extending a direct supply tube through said central cutout portion above said container lid to said bottom of said growth container;
    a quantity of growth medium placed upon said flat support mat forming a crown above said upper rim and being placed within said at least one wicking cell by and through said at least on growth medium port into said bottom of said growth container, said growth medium having a layer of fertilizer placed upon said growth medium crown; and
    a black plastic sheet stretched across said growth medium between said growth medium and said container lid held taut between said outer perimeter and said upper rim, wherein said water reservoir feed water into said water regulator tank and further dispensed into said growth container, providing a water supply within said bottom of said growth container which is wicked through said growth medium in said wicking cell to said growth medium above said support mat supplying water to plants grown with said growth medium below said black plastic sheet as said plants are growth through perforations within said black plastic sheet, said black sheet providing a condensation barrier to cause water within said growth container to be condensed and redirected through said layer of fertilizer back into said growth medium feeding said plants within said growth container with perpetual feeding while said water regulator supplies a perpetual supply of water.

2. The self-watering container gardening system as disclosed in claim 1, further comprising a layer of dolomite within said growth medium between said layer of fertilizer and said growth medium below said black plastic sheet to enhance condensate water absorption and distribution.

3. The self-watering container gardening system as disclosed in claim 1, said system watering supply further comprising:
    said one of said pair of hose fittings nearest in proximity and connected to said water regulator tank admitting water to said bottom of said container which pools within said bottom of said container up to a level of said opposing hose fitting, wherein water reaching a level above said other of said pair of hose fittings is released so that a controlled amount of water remains within said bottom of said growth container at all times, with overflow water amounts discharged through said other of said pair of hose fittings through a water tube to a next growth container, and so forth, with said growth medium with each said growth container receiving a constant and steady amount of moisture without over watering or underwatering;
    said black plastic further providing a perpetual and constant water regulation within said growth medium by providing a condensation barrier, wherein water which would normally evaporate and be lost to air is condensed below said black plastic sheet falls back into said growth medium dissolving a small amount of said layer of fertilizer or plant food carried back into said growth medium; and
    excess condensate and water wicked through said wicking cell further transported through said growth medium through said plurality of perforations in said support mat and returning to said bottom of said growth container, said system watering supply occurring perpetually.

* * * * *